(12) United States Patent
Peleska et al.

(10) Patent No.: US 10,625,636 B2
(45) Date of Patent: Apr. 21, 2020

(54) CHILD SEAT FOR ATTACHING TO A MOTOR VEHICLE SEAT

(71) Applicant: CYBEX GmbH, Bayreuth (DE)

(72) Inventors: Franz Peleska, Vienna (AT); Christoph Thurn, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 16/064,316

(22) PCT Filed: Dec. 22, 2016

(86) PCT No.: PCT/EP2016/082490
§ 371 (c)(1),
(2) Date: Jun. 20, 2018

(87) PCT Pub. No.: WO2017/109137
PCT Pub. Date: Jun. 29, 2017

(65) Prior Publication Data
US 2018/0370393 A1 Dec. 27, 2018

(30) Foreign Application Priority Data
Dec. 23, 2015 (DE) .................... 20 2015 107 068 U (51) Int. Cl.
*B60N 2/28* (2006.01)
*B60N 2/42* (2006.01)
(Continued)

(52) U.S. Cl.
CPC ......... *B60N 2/2812* (2013.01); *B60N 2/2884* (2013.01); *B60N 2/42709* (2013.01); *B60N 2002/2815* (2013.01)

(58) Field of Classification Search
CPC . B60N 2/2812; B60N 2/2884; B60N 2/42709
(Continued)

(56) References Cited

U.S. PATENT DOCUMENTS

| 5,294,183 A * | 3/1994 | Wetter | B60R 22/14 297/216.11 |
| 6,513,870 B1 * | 2/2003 | Takizawa | B60N 2/2812 297/216.11 |

(Continued)

FOREIGN PATENT DOCUMENTS

| CN | 104627117 | 5/2015 |
| DE | 4023641 | 1/1992 |

(Continued)

OTHER PUBLICATIONS

"International Application No. PCT/EP2016/082490, International Search Report and Written Opinion dated Mar. 31, 2017", (Mar. 31, 2017), 11 pgs.

(Continued)

*Primary Examiner* — Rodney B White
(74) *Attorney, Agent, or Firm* — Schwegman Lundberg & Woessner, P.A.

(57) ABSTRACT

A device for attaching to a motor vehicle seat including a seat region and a back section, at least one shoulder strap, at least one retaining device for holding and/or deflecting the shoulder strap, and at least one force limiting means, which is designed such that the retaining device is transitioned from a first arrested position to a second arrested position upon exceeding a predetermined limit force exerted by the shoulder strap or by the shoulder straps on the retaining device in the event of an impact.

18 Claims, 8 Drawing Sheets

(51) Int. Cl.
  *B60N 2/427* (2006.01)
  *B60R 22/10* (2006.01)
  *B60R 22/12* (2006.01)
(58) Field of Classification Search
  USPC .................................................. 297/216.11
  See application file for complete search history.

(56) References Cited

U.S. PATENT DOCUMENTS

| | | | | |
|---|---|---|---|---|
| 7,219,958 B2* | 5/2007 | Yamazaki | ............ | B60N 2/2806 297/216.11 X |
| 8,328,275 B2* | 12/2012 | Vogt | ............ | B60N 2/2812 297/216.11 |
| 8,496,293 B2* | 7/2013 | Gaudreau, Jr. | ............ | B60N 2/2809 297/216.11 |
| 8,573,693 B2* | 11/2013 | Gaudreau, Jr. | ............ | B60N 2/2821 297/250.1 |
| 8,632,124 B2* | 1/2014 | Clement | ............ | B60N 2/2821 297/216.11 |
| 8,662,582 B2* | 3/2014 | Hall | ............ | B60N 2/2809 297/216.11 |
| 8,764,108 B2* | 7/2014 | Gaudreau, Jr. | ............ | B60N 2/2812 297/250.1 |
| 8,911,015 B2* | 12/2014 | Cohen | ............ | B60N 2/2812 297/216.11 X |
| 9,327,679 B2* | 5/2016 | Cheng | ............ | B60N 2/265 |
| 9,586,505 B2* | 3/2017 | Morgenstern | ............ | B60N 2/2812 |
| 9,610,866 B2* | 4/2017 | Mitsuo | ............ | B60N 2/2812 |
| 9,649,955 B2* | 5/2017 | Mitsuo | ............ | B60N 2/2812 |
| 9,714,002 B2* | 7/2017 | Cheng | ............ | B60N 2/2812 |
| 9,758,126 B2* | 9/2017 | Mitsuo | ............ | B60N 2/2812 |
| 10,173,553 B2* | 1/2019 | Mitchell | ............ | B60N 2/2812 |
| 10,293,713 B2* | 5/2019 | Anderson | ............ | B60N 2/2812 |
| 2003/0047972 A1* | 3/2003 | Burleigh | ............ | B60N 2/2809 297/216.11 |
| 2003/0159258 A1* | 8/2003 | Wetter | ............ | B60N 2/2812 24/633 |
| 2014/0252841 A1 | 9/2014 | Balensiefer, II et al. | | |
| 2014/0265489 A1* | 9/2014 | Morgenstern | ............ | B60N 2/2812 297/256.15 |
| 2015/0076875 A1* | 3/2015 | Cheng | ............ | B60N 2/265 297/216.11 |

FOREIGN PATENT DOCUMENTS

| | | |
|---|---|---|
| DE | 10107874 | 9/2002 |
| DE | 102005025570 | 12/2006 |
| DE | 102005038814 | 2/2007 |
| DE | 202008008884 | 1/2009 |
| EP | 0805066 | 11/1997 |
| EP | 1762425 | 3/2007 |
| WO | WO-2017109137 | 6/2017 |

OTHER PUBLICATIONS

"International Application No. PCT/EP2016/082490, International Preliminary Report on Patentability dated Jun. 26, 2018", (w/ English Translation), 11 pgs.

"International Application No. PCT/EP2016/082490, Written Opinion dated Mar. 31, 2017", (w/ English Translation), 8 pgs.

* cited by examiner

CHILD SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2016/082490, filed on 22 Dec. 2016, and published as WO2017/109137 on 29 Jun. 2017, which claims the benefit under 35 U.S.C. 119 to German Application No. 20 2015 107 068.3, filed on 23 Dec. 2015; the benefit of priority of each of which is claimed herein, and which applications and publication are hereby incorporated herein by reference in their entirety.

The invention relates to a child seat for attaching to a motor vehicle seat according to claim 1.

In the prior art, child seats are known for attaching to a motor vehicle seat. Such child seats may have their own belt system or be designed for attachment to the belt system of the car. Typically, such a child seat comprises at least one seat shell (seat region) and a backrest. Furthermore, such a child seat can have a headrest or a support foot or other components.

In this context, it should be noted that in the context of this invention, the term "child seat" is to be understood as a generic term for "classic" child car seats and baby carriers. Thus, features provided for a child seat in the context of this invention are basically also applicable to a baby carrier and vice versa, unless stated otherwise. The same applies to the term "child", which is also to be understood as a generic term for children and babies as well as toddlers.

So-called "baby carriers" often comprise (only) a one-piece shell for accommodating the baby or child and may comprise a separate belt system, optionally a headrest and possibly further components. Instead of a (structurally delineated) backrest, such "baby carriers" have a back section which adjoins a "seat region" in which the buttocks of the child can be accommodated.

In general, it is known that a child is secured in a child seat by the three-point belt of the car or by a belt provided on the child seat itself (for example, a five-point belt, a chest belt, or the like). In this case, a belt can be guided over a shoulder of the child in the seat in the direction of an opposite side of the pelvis. However, two straps can also be provided, which are each guided over one of the shoulders. At least for seats with their own belt system, it is well known to allow an adjustment of the position of the belt system to the size of the child. In particular, solutions are known in which various positions of the belt system can be locked via a positive engagement of a suitable element, for example in a toothed rack.

Common to these known systems is that the child in the seat—in the event of a collision of the car—is initially further moved due to the inertia and then abruptly braked by the straps. The child's head, however, continues to move, which can result in a pitching motion and an impact of the chin on the chest, which can cause dangerous injuries, such as in the area of the neck vertebrae.

For this reason, it is generally desirable to limit the child's acceleration and absorb force peaks. For this purpose, corresponding force limiters are known in the prior art, which can absorb force peaks. For example, DE 10 2005 038 814 A1 proposes the use of a hydraulic element which increases the energy absorption capacity of the belt when the belt is loaded in the event of an impact. In EP 0 805 066 A2, a plastically deformable torsion bar is proposed, which deforms in the event of an impact and thereby absorbs energy or intercepts a force peak.

DE 10 2005 025 570 A1 likewise proposes the use of a plastically deformable component, specifically a holder for the straps, which has a region intended for deformation. As a supplementary force-limiting means, tear seams are mentioned in the belt, which release a belt section in a defined manner in the event of an excessive force, so that the body of the child in the seat can move further forward and thereby deceleration energy can be reduced. In DE 10 2005 025 570 A1, a complete replacement of the force limiter must take place for adjustment to the size or weight of the child. DE 101 07 874 A1 also describes plastically deforming force-limiting means whose force-limiting threshold changes as a function of the set belt length or position. For this purpose, for example, several deflections are provided, which have different material thicknesses. By reattaching the belt system to another deflection device, the force-limiting means according to DE 101 07 874 A1 is to be adjusted to the size or weight of the child.

Overall, it is considered disadvantageous that the adaptation (if at all possible) of force-limiting means to the size or weight of the child must always be carried out in a relatively complex step in the prior art. Thus, when replacing the holder according to DE 10 2005 025 570 A1, as well as when transferring the straps according to DE 101 07 874 A1, the belt system must be newly set up, for example, removed and re-threaded.

It is an object of the invention to provide a child seat for attachment to a motor vehicle seat, which realizes a force limitation in the event of an impact in a simple and secure manner.

This object is achieved by a child seat according to claim 1.

In particular, the object is achieved by a child seat for attachment to a motor vehicle, comprising a seat region and a back section (backrest), at least one shoulder strap, at least one retaining device for holding and/or deflecting the shoulder strap, and at least one force-limiting means, which is designed such that the retaining device is transitioned from a first arrested position to a second arrested position (so that a force retaining the child is reduced or energy is absorbed) upon exceeding a predetermined limit force exerted by the shoulder strap (or by the shoulder straps if the retaining device is formed for retaining and/or deflecting two shoulder straps) on the retaining device in the event of an impact.

A core idea of the invention is that the retaining device can basically assume two (predetermined) positions, wherein the second position (in the case of an accident) is reached only when a predetermined limit force is exceeded. The (entire) retaining device is thus displaced to absorb force peaks or to absorb energy in the event of an impact. The retaining device (preferably) remains dimensionally stable during this displacement (thus does not change its shape). The force-limiting means is preferably designed so that when the second position is reached and the body of the child has come to rest (i.e. after the impact) or no force acts from the shoulder strap, the retaining device remains in the second position. Both in the first position and in the second position, the retaining device is preferably latched (in particular in a form-fitting manner), that is, assumes a first or second latching position. Overall, the force-limiting means and the retaining device are preferably configured so that at least one component of the force acting on the retaining device acts in the direction of a connecting line between the individual (latching) positions. The latching (locking) is preferably interlocked, but can occur alternatively or additionally (at least partially, possibly completely) in a force-locked manner. As a result of the (predetermined) locking positions (in particular latching positions), a force peak can be intercepted in a simple manner on the one hand, and the shoulder strap is held securely and reliably both before and after the impact on the other hand. Furthermore, the at least one force-limiting means is characterized by a simple structure, so that manufacturing costs are reduced.

In a specific embodiment, at least one adjusting device is provided for adjusting at least two different positions, in particular at least the first and second locked position (in particular latching position) of the retaining device relative to the back section (the backrest) for adjusting the belt length and/or position to the size and/or the weight of a child in the child seat. As a result of such an adjusting device, the child seat can be easily adapted to the needs of the child. In a preferred and particularly simple design, a displacement from a first to a second (latching) position can occur on the one hand by actuation of the adjusting device (for example via a handle) and on the other hand (in the event of an impact) by the action of the force-limiting means. Such a construction is particularly simple and reliably protects against the consequences of an impact. The adjusting device especially concerns a height adjustment device, so that the child seat can be adapted to the size of the child. For this purpose, the retaining device can be locked in the various (latching) positions.

Preferably, at least one latching device is provided, via which the retaining device can be locked in (the) at least two positions, in particular engages in (the) at least two latching positions. Concretely, at least two complementary latching elements may be provided for this purpose (for example a projection, in particular a bolt and a corresponding recess, in particular a pocket). Basically, the locking can be carried out via an interlocking and/or frictional connection. For example, a locking element can engage in a pocket-like structure, wherein optionally the individual pockets are separated from each other by at least one web (or the like). However, it is also possible that a locking element (projection) engages in a toothed strip (or their receptacles) or a perforated strip (or their holes) or in any other suitable structure. In any case, such locking allows a reliable and easy hold of the retaining device in its respective position, which increases safety in the event of an accident. Specifically, the individual positions can be defined by individual receptacles (in particular pockets) and/or projections and/or (continuous or interrupted) connecting webs, which are preferably components of an integral component, and/or by a toothed strip and/or a perforated strip.

In a preferred embodiment, the retaining device can be brought into at least three positions (preferably via the adjusting device), wherein the next position is assumed when a first limiting force is exceeded and a position lying further away (in particular the next but one) is assumed when a second limiting force is exceeded. In general, it is possible that with sufficiently long acting and sufficiently large force, several (latching) positions are successively overcome. As a result of each transition from one position to the adjacent position (e.g. each web is placed between two receptacles, in particular pockets), a force-limiting means can be provided. This embodiment allows a very simple ("automatic") setting of the force limit or energy absorption. In the case of a rather small or light child, for example, only the next position can be taken (in the case of an impact), and for a larger child the one but next, for an even larger child optionally the next following position. It is therefore no longer necessary that the force limit is set by the user with regard to the size and weight of the child (with a corresponding risk of incorrect operation). The child seat is then designed per se in an accordingly "adaptive" manner. As a result, the problem existing in the prior art that even particularly pronounced force peaks occur due to incorrect operation can be reduced in a simple manner.

Preferably, the retaining device is connected to a headrest and/or displaceable together with the headrest. In such a case, the shoulder strap can be easily and reliably adapted to the size of the child, namely, when the headrest is adapted to the size of the child. This also increases the safety in the event of an impact.

In a specific embodiment, the adjusting device may have a handle, in particular for preferably the pulling release of the lock. Alternatively or additionally, a spring, in particular return spring, can be provided for producing the lock. This allows a (height) adjustment of the retaining device and possibly the headrest in a simple and quick way.

For example, for regular adjustment of the locked belt system, the locking element can be moved out of a corresponding pocket (for example by pulling a handle against a spring force), then the position of the belt system can be adjusted as desired and the locking element can be moved back into a pocket (for example, by releasing the handle and possibly the action of the spring force). Preferably, the unlocking can also take place when the seat is installed in the vehicle and a child sits in it, for example in that the handle, possibly a lever and/or switch or the like, is attached for unlocking the height adjustment to an upper end of the seat and thus is accessible at all times.

Preferably, the force-limiting means are formed by regions between the locked positions (for example, by webs between pockets or elevations or teeth of a toothed strip). Further preferably, at least one section between two latching devices (for example pockets or generally recesses) is plastically or elastically deformable when the limit force is overcome and/or is destroyed, in particular breaks or tears. In general, these intermediate sections should preferably be designed so that they allow transfer to an adjacent position in the event of a force exceeding the limit force (in the direction of a connecting line between the individual locked positions).

In a specific embodiment, at least one web is arranged between two latching devices (for example pockets), which is preferably plastically deformed when the predetermined limit force is exceeded or breaks such that the retaining device is transferred from one to the other position. Further preferably, a plurality of webs (and associated three or more latching devices, in particular three or more pockets) are provided, wherein the webs are made with different thickness. Such a web can easily and effectively provide a force-limiting means. If a plurality of webs is provided with different thicknesses, different limit forces to be overcome can be set depending on the respective position in which the retaining device is located. The thickness of the webs can increase in one direction. For example, if four webs are provided, wherein these four webs are arranged in the order of first web, second web, third web and fourth web, the respective next web (for example, the third web) may be formed thicker than the respectively previously arranged one (for example, second web). In such a configuration, in particular, the thickest web may be positioned highest so that when the retaining device is located in a comparatively high position (corresponding to a tall or heavy child), a high limit force is provided and then, when the retaining device is located in a rather low position (which corresponds to a rather small or light child), a rather low limit force is provided. Generally (with several webs) these can be formed in different thicknesses. However, it is also conceivable that these are formed by different materials, wherein they differ in terms of their resistance (or against deformation or breaking). If necessary, exactly one web can optionally be provided between two latching positions, but alternatively a plurality of webs (or an interrupted web). Instead of a web, (for example, two) springs, in particular leaf springs, may be provided which deform elastically in the event of an impact and when exceeding the limit force allow a transfer to another (latching) position. Other means for elastic deformation (instead of leaf springs) are conceivable.

In a specific embodiment, the retaining device can be brought to at least three (locked) positions (preferably via the adjusting device), namely at least to a first, a second and a third position. Preferably, a limit force—in particular defined by the structural design (e.g. choice of material and/or thickness) of intermediate regions—for shifting from the first to the second position in the event of an impact is higher (or lower), in particular by at least 5%, preferably at least 10%, than a limit force for shifting from the second to the third position. Preferably, the first position is a highest position, the second position is a middle position, and the third position is a lowest position of the retaining device. Overall, a user-friendly and safe adjustment of the force limit can be realized thereby.

In a specific embodiment, the at least one force-limiting means comprises an inclined surface, which is arranged and designed such that a locking element (only) slides out of a locked (bolted) position when the limit force is exceeded, wherein the inclined surface is preferably provided on the locking element or on a bolt receptacle. Force limitation can thus be provided in a simple manner.

In further concrete embodiments, the force-limiting means has an at least partially convex or trapezoidal locking element. Also, force limitation can thus also be provided in a simple manner.

In general, the force-limiting means may comprise at least one spring, in particular leaf spring. As a result of such a spring, a force-limiting means can be realized by elastic deformation thereof, so that the child seat (after the impact) is brought back to its original state again (except that another locked position is assumed if the predetermined limit force is exceeded).

Basically, the limit force should be adjusted to the weight of the child. The limit force may be at least 500 N, preferably at least 1000 N, particularly preferably at least 1500 N and/or at most 21000 N, preferably at most 17000 N, more preferably at most 15000 N. In general, a load of (approximately) 50 g (i.e. 50 times the acceleration due to gravity) can be tolerated, at least for a short time, in the event of an impact. The measure of the force threshold thus results advantageously from this limit and the weight of the child. In the case of child seats, the maximum permissible weight may be 36 kg. The minimum weight, for example, for baby carriers, can be about 2.5 kg. In the case of different limit forces (with more than two locked positions or corresponding force-limiting means), the limit force in the highest position may be in an upper range (for example in the range of 12000 to 21000 N) and in the lowest position in a lower range (e.g. 500 N to 11000 N). Optionally, other force thresholds (limit forces) for the force-limiting means can be obtained (for example, by a pulley-type deflection). In any case, the load on the child located in the seat should be limited to 40 to 60 g, preferably 45 to 55 g.

According to a general idea, the positions of the retaining device which can be intentionally adjusted (before the drive) by the adjusting device differ at least in part from the positions which can be assumed in the event of an impact by the action of the at least one force-limiting means. For example, there may be separate latching devices for the desired setting on the one hand and for limiting the force on the other. In a specific embodiment, the adjusting device may comprise an adjusting element which defines a plurality of positions for adjusting the strap length or position and is mounted so that it assumes (itself) a different position when a limit force is exceeded. Alternatively, the force-limiting means may comprise a force-limiting element which is adapted to displace the retaining device from the first to the second position when a predetermined limit force acting on the retaining device is exceeded, wherein the force-limiting element (itself) can be moved into a plurality of positions. In such embodiments, therefore, a change in position due to exceeding a limit force in the event of an impact is not identical to a corresponding position shift, which is carried out deliberately for height adjustment of the retaining device. As a result of such a separation of the different position changes, a particularly effective and reliable adjustment of both the force limit in the event of an accident and also the strap length or position is possible (before driving).

Further embodiments of the invention will become apparent from the dependent claims.

The invention will be described with reference to embodiments, which are explained in more detail below with reference to the figures, wherein:

FIG. 1b shows a section along the line Ib-Ib of FIG. 1a;

FIG. 2 shows a detail of the child seat according to the invention similar to FIG. 1a;

FIG. 6b shows a side view of the section according to FIG. 6a;

FIG. 6c shows a further oblique view of the section according to FIG. 6a;

FIG. 7b shows a side view of the section according to FIG. 7a;

FIG. 7c shows a further oblique view of the section according to FIG. 7a;

FIG. 10b shows a section along line Xb-Xb in FIG. 10a;

In the following description, the same reference numerals are used for identical and equivalent parts.

Figure 1A:
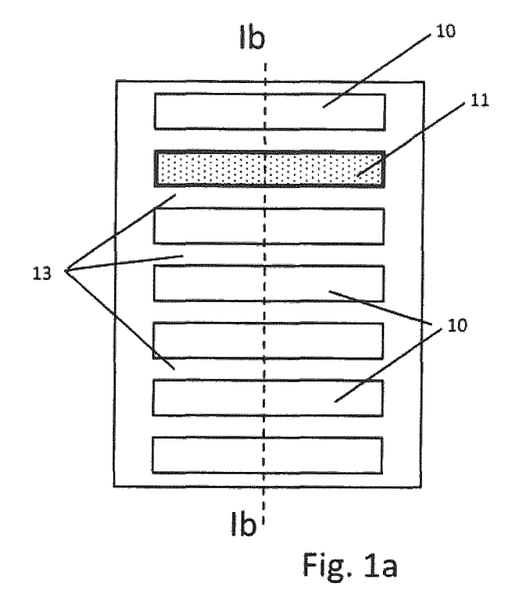
FIG. 1a shows a schematic view of a section of a child seat without the force-limiting means according to the invention.
Figure 1B:
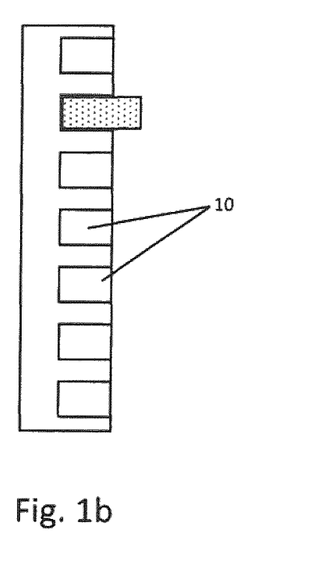

FIG. 1 shows a section of a child seat without force-limiting means according to the invention. The section can be, for example, a structure which is arranged on a rear side of the child seat, in particular a rear side of a backrest or a back section. Thus, FIGS. 1a and 1b show a structure for adjusting a retaining device 29 (not shown here—see FIGS. 13 to 15) for a shoulder strap with regard to its position, in particular height. For this purpose, (receiving) pockets 10 are provided, into which a locking element 11 can engage. The locking element 11 can be accommodated in each of the pockets 10 (in FIGS. 1a and 1b, for example, in the second pocket 10 from above). Furthermore, the locking element 11 is part of the retaining device for the shoulder strap or at least connected to such a retaining device. In principle, if two shoulder straps are provided, the shoulder straps can each be held in a separate retaining device, but preferably both shoulder straps are held by one retaining device 29 (see FIGS. 13 to 15).

Figure 2:
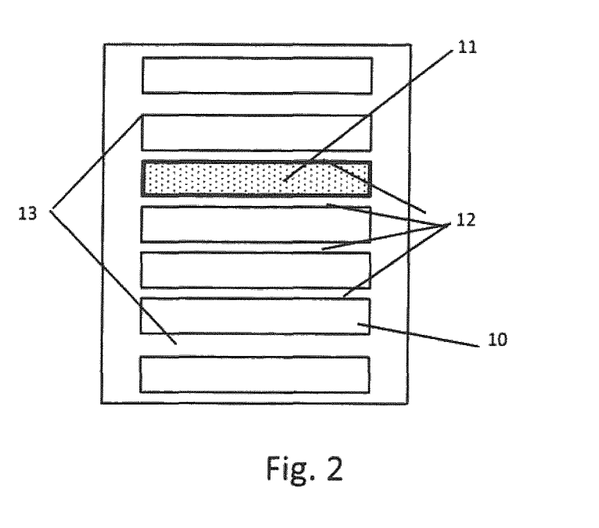

FIG. 2 shows a section analogous to FIG. 1a of a child seat according to the invention. The structure according to FIG. 2 differs from the structure according to FIGS. 1a and 1b by the provision of (comparatively thin) webs 12 between individual pockets (specifically the second pocket from the top to the second pocket from below). The webs 12 are formed such that upon exceeding a limit force (such as occurs in an impact accident for example) they are plastically deformed or even break, thereby enabling the transfer of the locking element 11 into the next position (for example, in the event of an accident the second web 12 from the top could break, thereby allowing a transfer of the locking element 11 of the third to the fourth pocket (from above)). Furthermore, according to FIG. 2, separating regions 13 are further provided between the two uppermost and the two lowermost pockets 10, which (as well as the corresponding separating regions 12 in FIGS. 1a and 1b) do not form a force-limiting means, since they do not allow a release of the lock by the locking element in the respective pocket even at maximum forces. For example, these separating regions 13 also withstand a force (which acts in the direction of the next pocket) of more than 21000 N, preferably more than 25000 N.

Figure 3A:
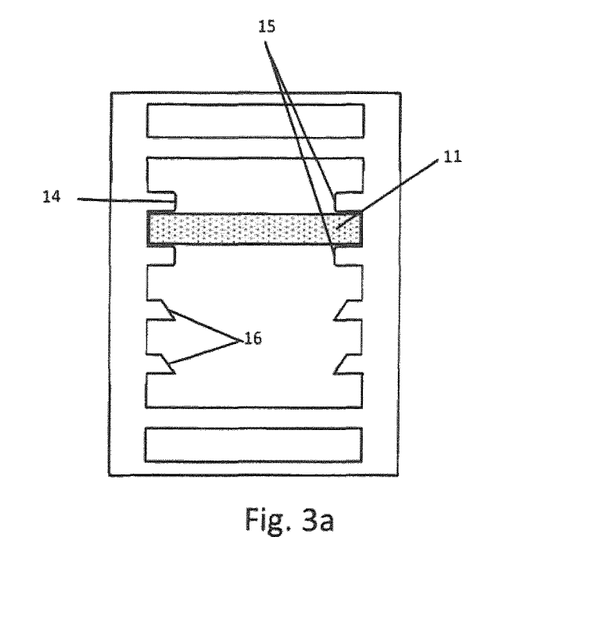
FIG. 3a shows a schematic representation of further embodiments of the child seat according to the invention analogous to FIG. 2.

In the alternative embodiment according to FIG. 3a (compared to the embodiment according to FIG. 2), the webs are partially "taken out". In other words, a respective web 12 (according to FIG. 2) is replaced by two projections (web projections) 14 which are directed towards one another. A pocket 10 may then be defined by four projections 14, for example. The projections 14 can either have a straight end 15 (as shown in FIG. 3a for the four upper projections 14) or an oblique end 16 (as shown in FIG. 3a for the four lower projections 14). In general, a beveled end may favor the sliding out of the locking element 11 into the next position (so that a lower limit force is sufficient for transferring to the next position). In particular, various limit forces (force thresholds) can be set by means of different oblique angles, e.g. the respective ends of the projections 14 can extend in an increasingly flattened manner from top to bottom.

Figure 3B:
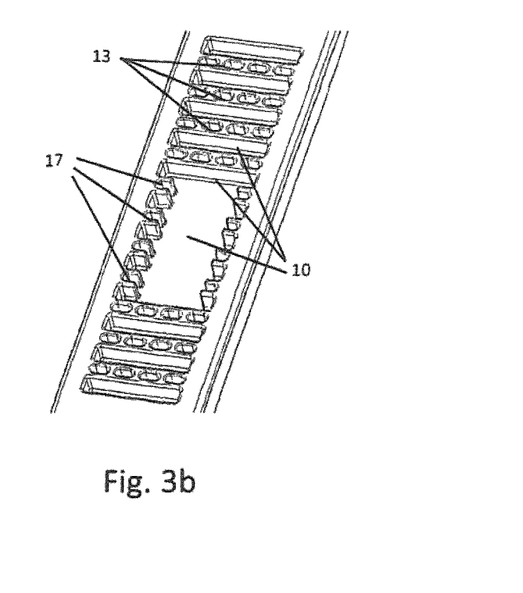
FIG. 3b shows an oblique view of another embodiment of the section analogous to FIG. 2.

FIG. 3b shows an oblique view of an embodiment analogous to FIG. 3a with further details. In particular, it can be seen there that, instead of individual projections 14, projection pairs 17 may be provided, wherein a pocket 10 can be defined by four pairs of projections 17. Furthermore, a pocket 10 can be formed by two projection pairs 17 and an (insurmountable) separation region 13.

Furthermore, a pocket can be formed by two (insurmountable) separation regions 13.

Figure 4:
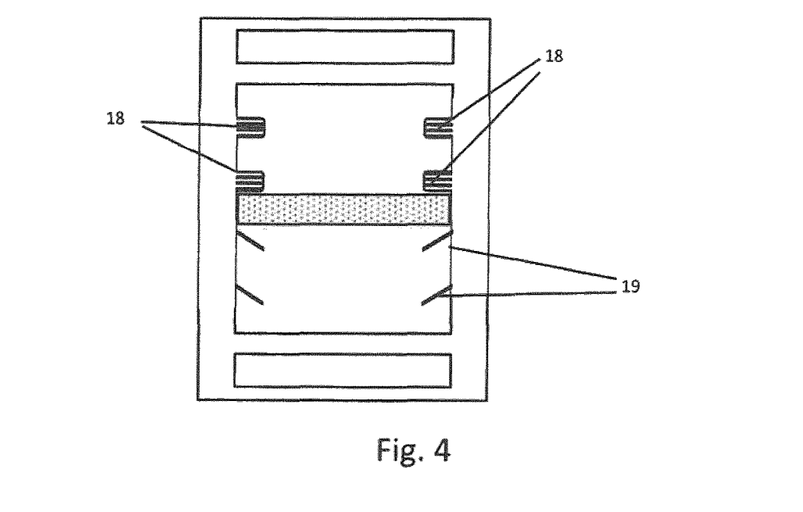
FIG. 4 shows different embodiments of force-limiting means analogous to the illustrations in FIGS. 1 and 2.

FIG. 4 shows further embodiments of the invention in a schematic view. In particular, it is shown that—instead of the projections (web projections) shown in FIGS. 3a and 3b—elastic projections 18 can be formed. Furthermore, the projections 14 can be replaced by leaf springs 19 (or other springs), which are also shown in FIG. 4. In general, the projections used can deform plastically or elastically or even break (when overcoming the force threshold).

Figure 5:
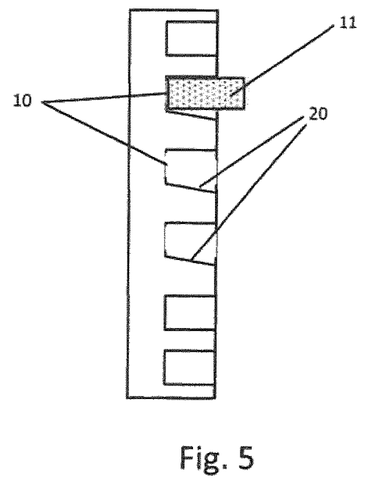
FIG. 5 shows a section analogous to FIG. 1b through a section of another embodiment of the child seat.

FIG. 5 shows a further embodiment in a section analogous to FIG. 1b. Here, the webs are geometrically designed (concretely by a slight slope of the force-loaded side surface) so that a larger component of the applied force pushes the locking element against the web and a smaller component lifts the locking element out of the pocket. When a force threshold is exceeded, the smaller force component overcomes the frictional resistance generated by the larger force component and the locking element 11 is lifted from the pocket 10 or slips over the slope 20 into the next pocket. In a corresponding manner, solutions for toothed or perforated strips or the like can be provided.

Figure 6A:
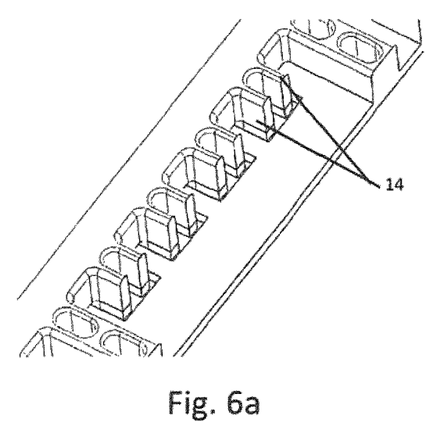
FIG. 6a shows an oblique view of a section of another embodiment of the child seat.
Figure 6B:
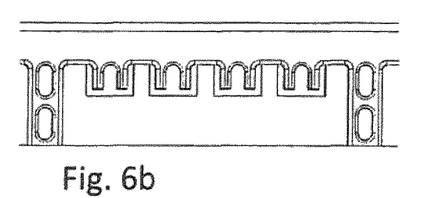
Figure 6C:
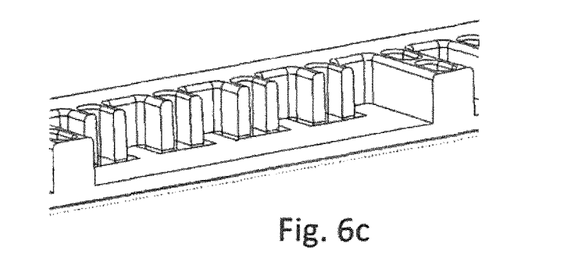
Figure 7A:
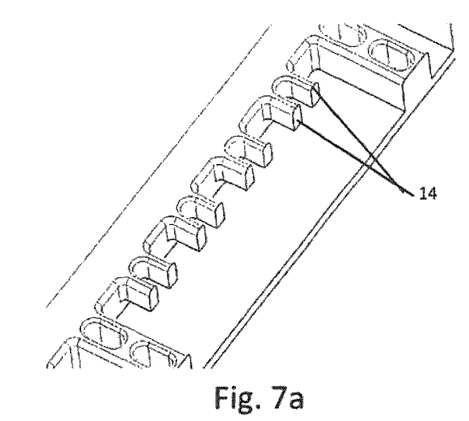
FIG. 7a shows an oblique view of a section of another embodiment of the child seat.
Figure 7B:
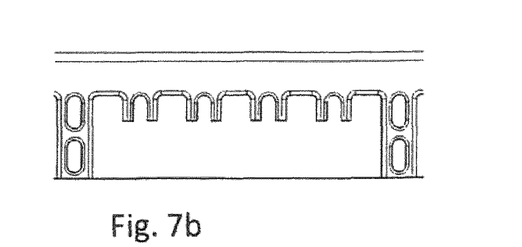
Figure 7C:
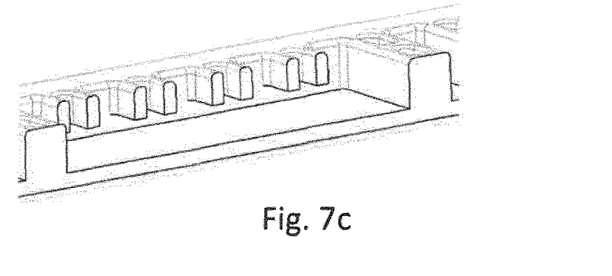

The webs or the projections (web extensions) 14 shown in FIGS. 6a to 6c can be connected to the surrounding structure on one side and on the bottom. However, they can also be connected to the structure only on the side (which is preferred) or only on the bottom. Alternatives for an arrangement only on one side are shown in FIGS. 6a to 6c and in FIGS. 7a to 7c (see in particular FIG. 7c). In FIGS. 6a to 6c and 7a to 7c, the projections (web inserts) are only laterally attached (connected). As a result, the projections hang freely in space, so that they can be easily deformed or broken, in order to facilitate a transfer of the locking element into the next position.

Figure 8A:
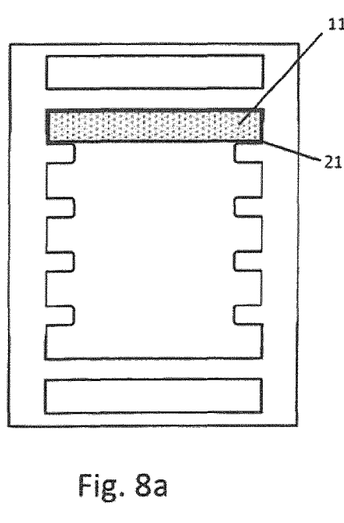
FIG. 8a shows a schematic section of another embodiment of the child seat according to the invention.
Figure 8B:
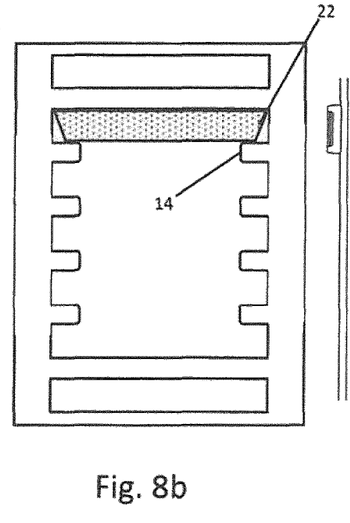
FIG. 8b shows a schematic section of another embodiment of the child seat according to the invention.
Figure 8C:
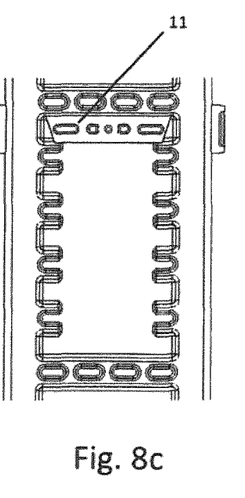
FIG. 8c shows a schematic section of another embodiment of the child seat according to the invention.

FIG. 8a shows a detail analogous to FIG. 2, namely with a locking element 11 having straight ends 21. Alternatively (see FIG. 8b), the locking element 11 may have sloping ends 22, so that a force acting on the projections 14 causes an increased surface load on the webs 14 and facilitates their elastic or plastic deformation or their breakage. In general, the geometric shape of the locking element may be selected so that an applied force causes increased point or area loading on the areas between the locked positions and facilitates their elastic or plastic deformation or breakage. This can furthermore be achieved, for example, by a trapezoidal structure (see FIGS. 8b and 8c). It is also possible to convexly form the force-loaded side of the locking element 11. Furthermore, the locking element may be formed elastically deformable.

Figure 9:
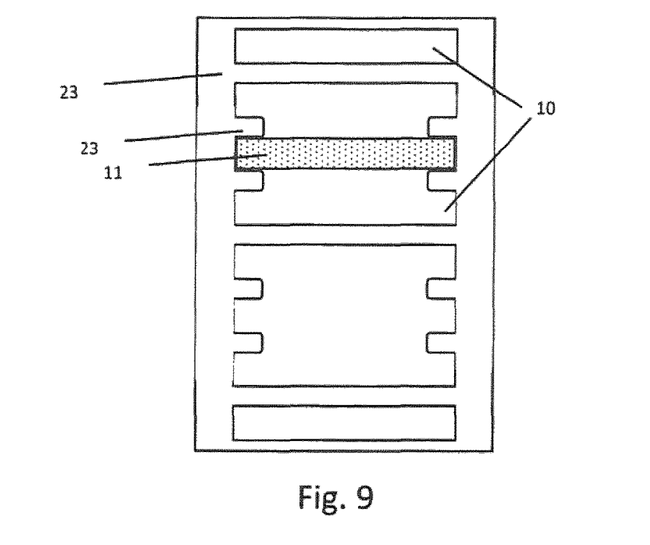
FIG. 9 shows a schematic section of another embodiment of the child seat according to the invention.

In a further embodiment (see FIG. 9), only a certain number of locked positions can always be overcome before an insurmountable position is assumed again. This can be realized, for example, by setting only individual intermediate regions 23 between the pockets 10 in such a way that they allow them to be overcome into the next position. For example, every third or every fourth intermediate region 23 can be insurmountable (see FIG. 9).

Figure 10A:
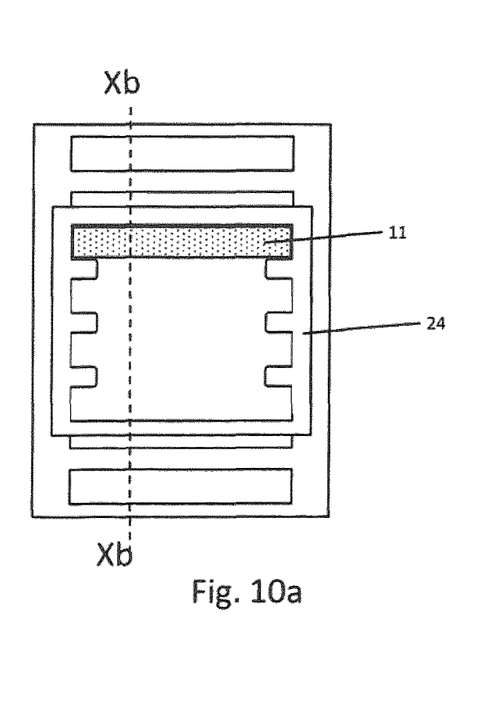
FIG. 10a shows a section of another embodiment of the child seat according to the invention.
Figure 10B:
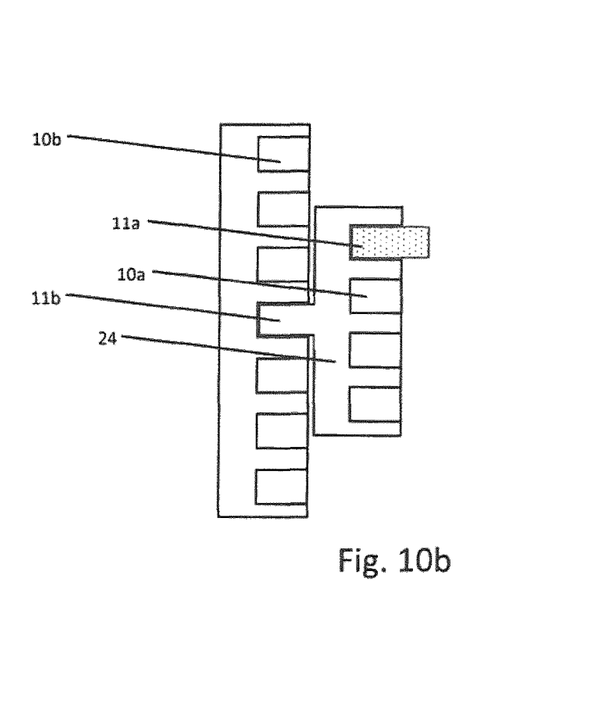

In another embodiment, an additional component 24 is used, which can be locked in a height-adjustable manner (but without force-limiting means)—in particular via a locking element 11b, which can optionally engage in associated pockets 10—and in turn defines several positions for locking the belt system including force-limiting means. In a preferred embodiment, the belt system can initially always be locked in the uppermost position within the component 24 and be transferred to a further position only when the defined limit force is exceeded. For example, the component 24 has pockets 10a for this purpose, into which a locking element 11a can engage.

Figure 11:
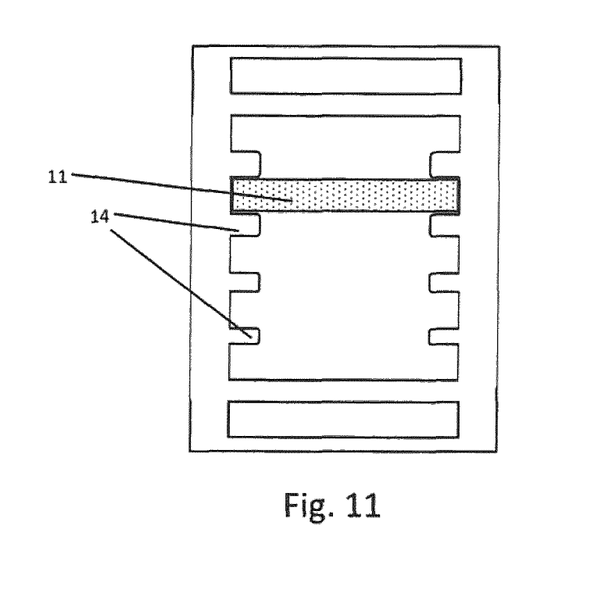
FIG. 11 shows a section of another embodiment of the child seat according to the invention.

In a further preferred embodiment (see FIG. 11), the limit force from which the force limitation takes effect is not the same in all positions, but depends on the position in which the belt system is locked. Thus, taking into account the commonly present correlation between height and weight of children, account can be taken of the above-described need to consider the weight of the child in the seat when selecting the force threshold. In various embodiments, this can be done by a suitable choice of the web thickness (FIG. 11) and/or the length of remaining web inserts (projections) and/or by the material thickness and/or a spring strength of a spring and/or an angle of a slope.

Figure 12A:
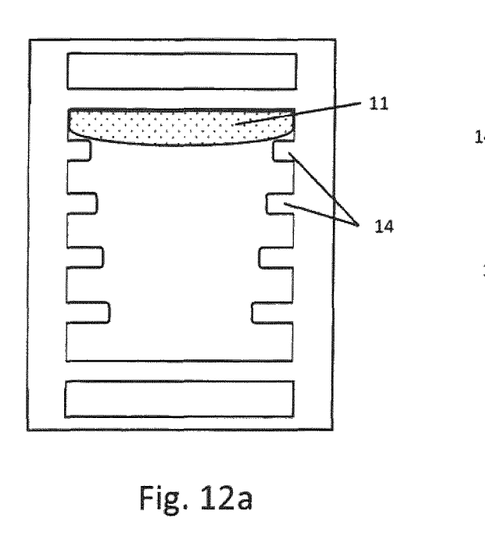
FIG. 12a shows a schematic section of another embodiment of the child seat according to the invention.
Figure 12B:
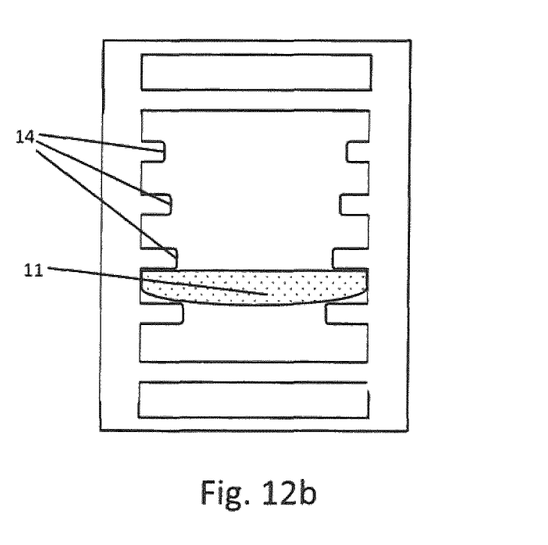
FIG. 12b shows a section according to FIG. 12a in a deviating position of a locking element.

In principle, the various embodiments can also be combined with one another as desired. Only as an example, web projections (projections) of different lengths can be connected to a locking element with a concave side (see FIGS. 12a and 12b).

Furthermore, the solutions and structures described above can also be transferred, for example, to toothed or perforated strips or to other suitable structures which, for example, permit interlocked and/or force-locked engagement.

Figure 13:
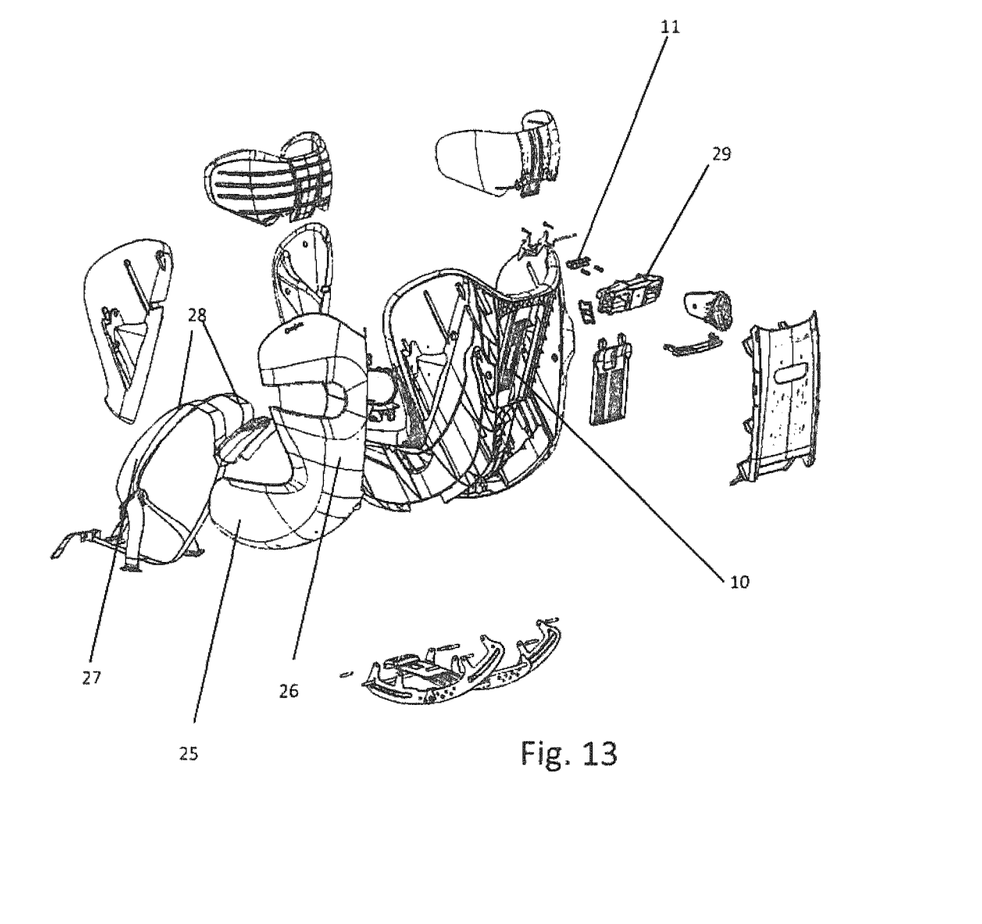
FIG. 13 shows an exploded view of a child seat according to the invention.
Figure 14:
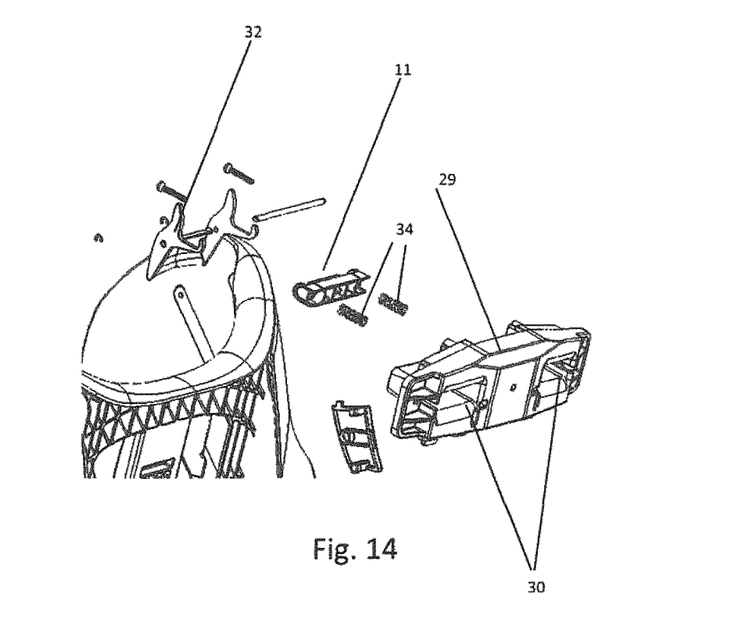
FIG. 14 shows an enlarged section of FIG. 13.
Figure 15:
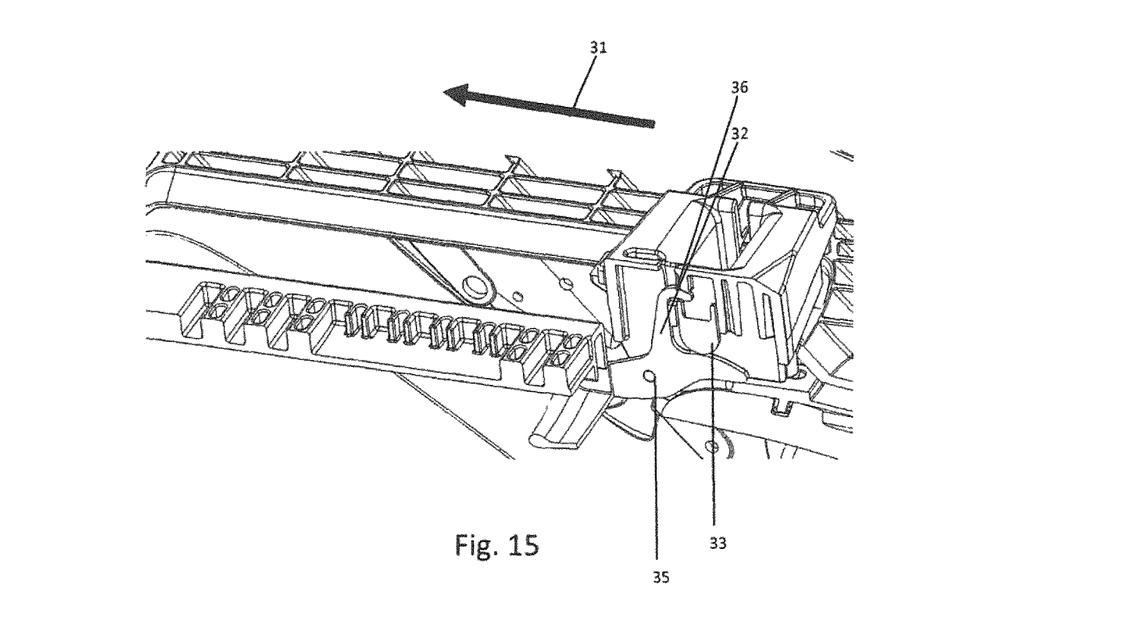
FIG. 15 shows a step section of FIG. 13.

FIG. 13 shows an exploded view of a child seat according to the invention, comprising a seat region 25, a back section 26, a belt system 27 with shoulder straps 28 and a retaining device 29 for holding and deflecting the shoulder straps 25. The retaining device 29 is connected to the locking element 11, which in turn can engage in pockets 10. FIG. 14 shows an enlarged detail of FIG. 13 with the retaining device 29 and the locking element 11. In the retaining device 29, belt guides 30 are arranged, through which the belt can be guided so that it is held and deflected. FIG. 15 shows a stepped section of a section according to FIG. 13. In FIG. 15, the force acting on the holding section by the shoulder straps 28 acts (essentially, at least with respect to the components) in the direction of the arrow 31, i.e. in one direction of the arrangement of the pockets 10, Furthermore, one recognizes in FIG. 15 details of an adjusting device which permits a deliberate setting of the position of the retaining device, in particular a height of the retaining device. Concretely, the adjusting device comprises a (claw-shaped) actuating element 32 which, when rotated about an axis 35 (counterclockwise in FIG. 15), pushes the locking element via an (arcuate) stop 33 out of its receptacle (pocket) against the action of springs 34 (shown in FIG. 14). The actuating element 32 has a hook-shaped, possibly undercut section 36, which secures the locking element against unintentional unlocking.

In general, it should be noted that the force or at least a component of the force acting from the shoulder strap on the retaining device in the event of an impact, preferably acts from top to bottom (parallel to the backrest), but also (depending on the specific embodiment of the belt guide) from bottom to top. It may even be that there is an intermediate position and the locking element is transferred from the underlying position upwards and from the overlying position down (or that a corresponding force acts).

Overall, a child seat is provided with force-limiting means with increased security. In particular, the force-limiting means may especially allow the optimum force-limiting means to be provided "automatically" when the belt layer is correctly adjusted. In this case, the limit force may possibly be selected lower than in the prior art, since a plurality of force-limiting means can act in succession.

At the same time, the solution according to the invention offers a high degree of comfort, since the selection of the force-limiting means does not take place in a separate step, but can be done automatically with the adjustment of the belt position, optionally in combination with the adjustment of the headrest. This setting is often necessary when using child seats anyway. In particular, the setting of the limit force need no longer necessarily be made, as was customary in the past, by reattaching or threading the straps, so that the child seat would have to be removed. Rather, the setting can be made conveniently, for example from the front. Even a setting during use is possible with suitable design.

Finally, the solution according to the invention is also particularly simple to manufacture, since its realization is possible with little effort compared to conventional solutions. For example, hydraulic elements can be completely dispensed with. Furthermore, the force-limiting means can be achieved, for example, alone by a modified shape of the already existing locking mechanism. In principle, no additional parts are required and all parts can be produced using the usual production processes, such as injection molding, extrusion blow molding or the like. There is also no effort by separate mounting.

It should be noted at this point that all parts described above taken alone and in any combination, in particular the details shown in the drawings, are claimed as essential to the invention. Modifications thereof are familiar to those skilled in the art.

LIST OF REFERENCE NUMERALS

10 Pocket
11 Locking element
12 Web
13 Separation region
14 Projection
15 Straight end
16 Oblique end
17 Pair of projections
18 Elastic projection
19 (Leaf) spring
20 Slope
21 End
22 Oblique end
23 Intermediate region
24 Component
25 Seat region
26 Back section
27 Belt system
28 Shoulder strap
29 Retaining device
30 Belt guide
31 Arrow
32 Actuating element
33 Stop
34 Spring
35 Axis
36 Section

The invention claimed is:

1. A child seat for attachment to a motor vehicle seat, the child seat comprising:
   a seat region and a back section;
   at least one shoulder strap;
   at least one retaining device for holding and/or deflecting the shoulder strap; and
   at least one force-limiting means, which is designed such that the retaining device is transferred from a first locked position to a second locked position upon exceeding a predetermined limit force acting from the shoulder strap or shoulder straps in the event of an impact on the retaining device; and
   at least one adjusting device providing at least two different positions of the retaining device relative to the back section for adjusting the belt length and/or position to the size and/or weight of a child located in the child seat.

2. The child seat according to claim 1, wherein the at least two different positions of the retaining device comprise at least the first and second locked position.

3. The child seat according to claim 1, wherein the at least one retaining device can be brought into at least three positions via the at least one adjusting device, wherein when a first limit force is exceeded, an adjacent position is taken and when a second limit force is exceeded, a position lying farther away, is taken.

4. The child seat according to claim 3, wherein any of the first and second limit force is at least 500 N and/or at most 21000 N.

5. The child seat according to claim 1, wherein an adjusting device comprises a handle for the release of a lock, and/or a spring, for locking the position of the at least one retaining device.

6. The child seat according to claim 1, wherein the at least one retaining device can be brought via the at least one adjusting device into at least three locked positions, namely at least a first, a second and a third position, wherein a limit force for displacement from the first to the second position is higher or lower by at least 5% than a limit force for displacement from the second to the third position.

7. The child seat according to claim 1, wherein the at least one force-limiting means comprises at least one spring.

8. The child seat according to claim 1, wherein the positions of the at least one retaining device provided by the at least one adjusting device, can differ at least partially from the positions configured to be taken in the event of an impact by the action of the at least one force-limiting means,
   wherein the at least one adjusting device comprises an adjusting element which defines a plurality of positions for setting the belt length or position and is mounted so that it takes a further position when exceeding a limit force; or
   wherein the at least one force-limiting means comprises a force-limiting element configured to displace the at least one retaining device from the first to the second locked position when a predetermined limit force acting from the at least one shoulder strap on the at least one retaining device is exceeded, wherein the force-limiting element can be moved into a plurality of positions.

9. A child seat for attachment to a motor vehicle seat, the child seat comprising:
   a seat region and a back section;
   at least one shoulder strap;
   at least one retaining device for holding and/or deflecting the shoulder strap; and
   at least one force-limiting means, which is designed such that the retaining device is transferred from a first locked position to a second locked position upon exceeding a predetermined limit force acting from the shoulder strap or shoulder straps in the event of an impact on the retaining device, wherein the retaining device can be locked in at least two positions via at least one latching device.

10. The child seat according to claim 9, wherein the at least one latching device comprises at least two complementary latching elements.

11. The child seat according to claim 10, wherein individual positions of the at least one retaining device are defined by individual latching elements being formed as pockets and/or projections and/or connecting webs.

12. The child seat according to claim 10, wherein between two latching elements at least one web or at least one web projection is arranged, which is deformed or breaks when a predetermined limit force is exceeded, such that the retaining device is transferred from one to the other position.

13. The child seat according to claim 12, wherein a plurality of webs or web projections of differing thicknesses are provided.

14. The child seat according to claim 10, wherein a first latching element comprises a projection and a second latching element comprises a recess complementing the projection.

15. The child seat according to claim 14, wherein when overcoming a limit force at least a section between two latching elements being formed as two recesses is plastically or elastically deformable and/or destroyed.

16. The child seat according to claim 14, wherein the projection is at least partially convex or trapezoidal shaped.

17. A child seat for attachment to a motor vehicle seat, the child seat comprising:
   a seat region and a back section;
   at least one shoulder strap;
   at least one retaining device for holding and/or deflecting the shoulder strap; and
   at least one force-limiting means, which is designed such that the retaining device is transferred from a first locked position to a second locked position upon exceeding a predetermined limit force acting from the shoulder strap or shoulder straps in the event of an impact on the retaining device, wherein the retaining device is connected to a headrest and/or is displaceable together with the headrest.

18. A child seat for attachment to a motor vehicle seat, the child seat comprising:
   a seat region and a back section;
   at least one shoulder strap;
   at least one retaining device for holding and/or deflecting the shoulder strap; and
   at least one force-limiting means, which is designed such that the retaining device is transferred from a first locked position to a second locked position upon exceeding a predetermined limit force acting from the shoulder strap or shoulder straps in the event of an impact on the retaining device, wherein the at least one force-limiting means comprises an inclined surface which is arranged and formed such that a locking element slides out of a locked position when a limit force is exceeded.

* * * * *